United States Patent
Bhat et al.

(10) Patent No.: US 8,509,601 B2
(45) Date of Patent: Aug. 13, 2013

(54) METHOD TO SEAMLESSLY INSERT AUDIO CLIPS INTO A COMPRESSED BROADCAST AUDIO STREAM

(75) Inventors: Dinkar N. Bhat, Princeton, NJ (US); Christopher S. Del Sordo, Souderton, PA (US); Thomas L. Du Breuil, Ivyland, PA (US); Glen P. Goffin, Dublin, PA (US)

(73) Assignee: General Instrument Corporation, Horsham, PA (US)

( * ) Notice: Subject to any disclaimer, the term of this patent is extended or adjusted under 35 U.S.C. 154(b) by 921 days.

(21) Appl. No.: 12/631,539

(22) Filed: Dec. 4, 2009

(65) Prior Publication Data

US 2011/0142427 A1    Jun. 16, 2011

(51) Int. Cl.
*H04N 5/93* (2006.01)
*G11B 27/00* (2006.01)

(52) U.S. Cl.
USPC ............................................ 386/285; 386/278

(58) Field of Classification Search
USPC .................................. 386/248, 278, 285–287
See application file for complete search history.

(56) References Cited

U.S. PATENT DOCUMENTS

| | | | |
|---|---|---|---|
| 5,029,014 | A | 7/1991 | Lindstrom |
| 5,796,423 | A | 8/1998 | Robbins et al. |
| 7,263,280 | B2 | 8/2007 | Bullock et al. |
| 2002/0099552 | A1 | 7/2002 | Rubin et al. |
| 2004/0107169 | A1 | 6/2004 | Lowe |
| 2009/0265022 | A1 | 10/2009 | Kirovski et al. |

FOREIGN PATENT DOCUMENTS

WO     2007075434 A2     7/2007

OTHER PUBLICATIONS

PCT Search Report & Written Opinion, RE: Application #PCT/US2010/057574; Feb. 28, 2011.

*Primary Examiner* — Thai Tran
*Assistant Examiner* — Nigar Chowdhury
(74) *Attorney, Agent, or Firm* — Lori Ann D. Swanson

(57) ABSTRACT

A method and computing system for seamlessly inserting a local audio clip into a primary audio stream. The method sends the primary audio stream to an audio output port, and determines main parameters for the primary audio stream. The method receives a request to insert an encoded local audio clip, locates an insertion point in the primary audio stream that coincides with an end of a frame boundary, and identifies a best matching encoded local audio clip for the main parameters. The method receives and sends the best matching encoded local audio clip to the audio output port, stores the primary audio stream in a buffer while sending the best matching encoded local audio clip, and resumes the sending of the primary audio stream when the sending of the best matching encoded local audio clip is complete.

23 Claims, 2 Drawing Sheets

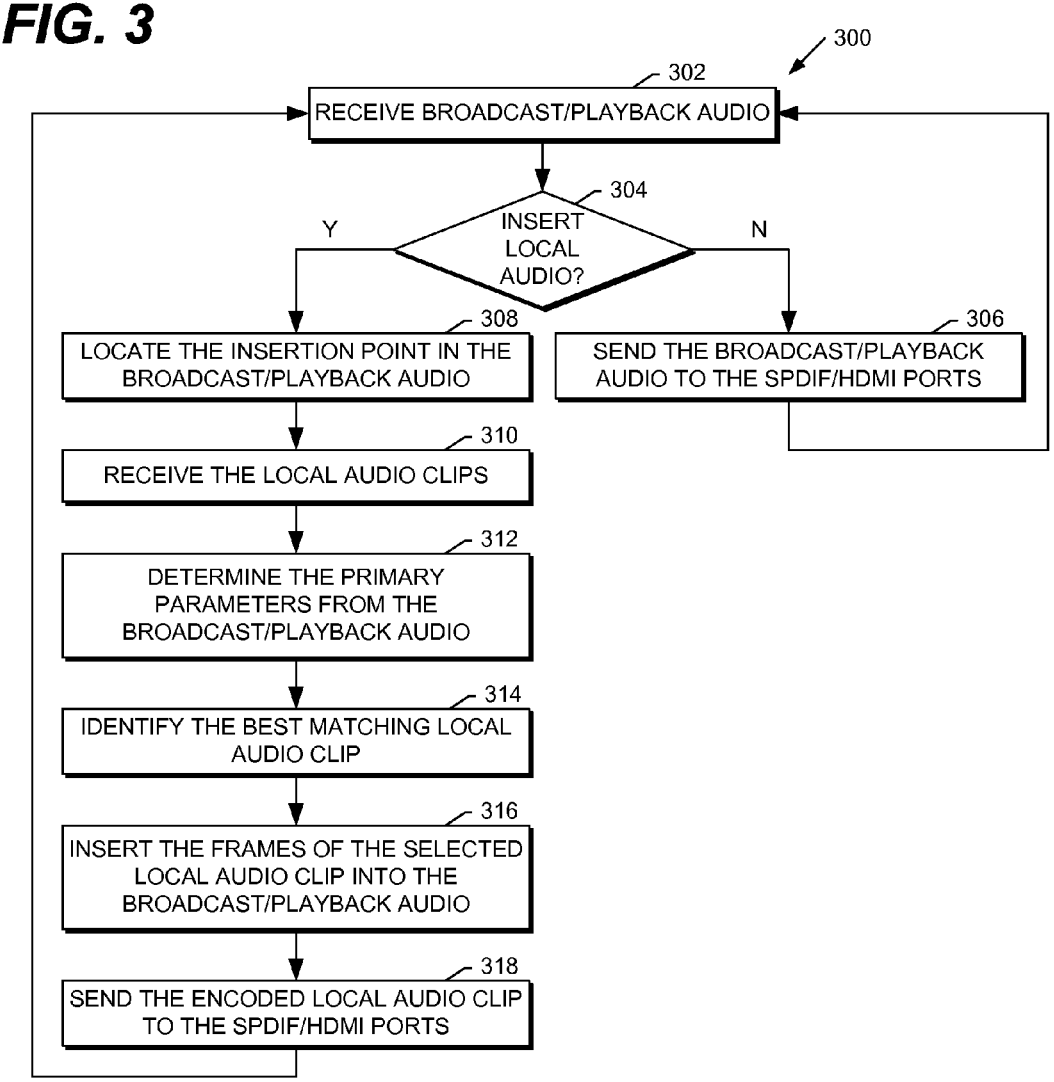

METHOD TO SEAMLESSLY INSERT AUDIO CLIPS INTO A COMPRESSED BROADCAST AUDIO STREAM

BACKGROUND

A set top digital video recorder (DVR) is a computing device that records digital data streams for broadcast television, cable television, or satellite television. The set top DVR may be a stand-alone or portable device, integrated into a set-top box provided by a cable or satellite provider, or created using components and software in a computer. The set top DVR typically includes a large capacity hard drive for recording and storing the digital data streams for viewing at a later time. The hard drive provides the ability to watch a live digital data stream, watch a recorded digital data stream, or watch a recorded digital data stream while recording a live digital data stream.

A prior art approach for switching audio output from the broadcast audio of a live digital data stream to the sound effects audio of a recorded digital data stream, and back to the broadcast audio would stop the broadcast audio, reset the Sony Phillips Digital Interface (SPDIF) mode and the High Definition Multimedia Interface (HDMI) mode, play the local audio, reset the SPDIF mode again to compressed mode, and restart the broadcast audio. One disadvantage of this approach is that it typically results in significant delays due to stopping and starting the broadcast audio and changing the SPDIF modes. There is a need for a system and method that enables the insertion of sound effects into broadcast audio in a seamless fashion that preserves the broadcast audio frame boundaries, thereby preventing the external receiver from resetting due to buffer overflow or underflow.

SUMMARY

Aspects of the present invention provide a method and computing system for seamlessly inserting a local audio clip into a primary audio stream. The method sends the primary audio stream to an audio output port, and determines main parameters for the primary audio stream. The method receives a request to insert an encoded local audio clip, locates an insertion point in the primary audio stream that coincides with an end of a frame boundary, and identifies a best matching encoded local audio clip for the main parameters. The method receives and sends the best matching encoded local audio clip to the audio output port, stores the primary audio stream in a buffer while sending the best matching encoded local audio clip, and resumes the sending of the primary audio stream when the sending of the best matching encoded local audio clip is complete.

BRIEF DESCRIPTION OF THE DRAWINGS

FIG. 3 is a flow diagram that illustrates a method for seamless switched audio output in a computing device according to an embodiment of the present invention.

DETAILED DESCRIPTION

Figure 1:
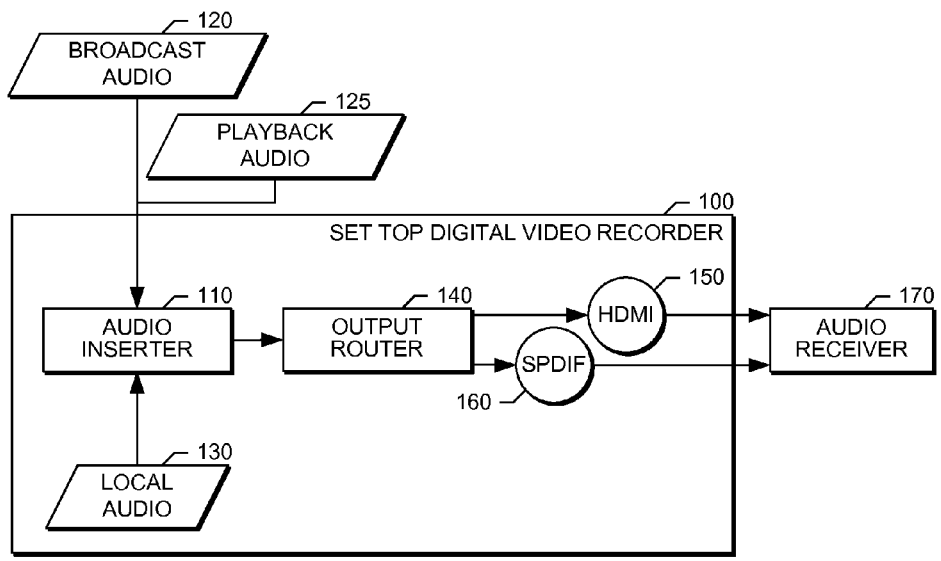
FIG. 1 is a block diagram that illustrates one embodiment of hardware components for a computing device that performs the present invention.

FIG. 1 is a block diagram that illustrates one embodiment of hardware components for a computing device that performs the present invention. As shown in FIG. 1, the computing device is a set top digital video recorder 100 that includes an audio inserter 110 component, an output router 140 component, an HDMI 150 port, and an SPDIF 160 port. The audio inserter 110 component of the computing device 100 includes a digital port that connects to the output router 140 component, and receives audio input from broadcast audio 120, playback audio 125, or local audio 130. In various embodiments, the broadcast audio 120 is sourced via an inband tuner (QAM source) or IP Stream (IPTV source) for the set top digital video recorder 100. In either of these embodiments, the playback audio 125 is played back from a hard-disk drive or retrieved from a network server. In various other embodiments, the audio inserter 110 receives the local audio 130 from a hard drive or memory of the set top digital video recorder 100. In either of these embodiments, the local audio 130 is stored in compressed form as a sequence of audio frames (elementary stream format) with each frame consisting of a header followed by blocks of compressed data where the header includes information about the compression method used, sampling rate, etc. In various embodiments, the compression format is Digital Dolby Audio (AC3), Dolby Digital Plus (E-AC-3) Audio, or Advanced Audio coding (AAC).

When the audio inserter 110 component of the computing device 100 receives broadcast audio 120 or playback audio 125, the audio inserter 110 sends the broadcast audio 120 or playback audio 125 to the output router 140 component. The output router 140 component then transmits the broadcast audio 120 or playback audio 125 over its digital port to the HDMI 150 port and to the SPDIF 160 port for the set top digital video recorder 100. The output of the HDMI 150 port and the SPDIF 160 port is sent to an audio receiver 170. In one embodiment, the audio receiver 170 is an external device to the set top digital video recorder 100.

When the audio inserter 110 component of the computing device 100 receives local audio 130, the audio inserter 110 replaces the broadcast audio 120 or playback audio 125 and sends the result to the output router 140 component. The output router 140 component then transmits the local audio 130 over its digital port to the HDMI 150 port and to the SPDIF 160 port for the set top digital video recorder 100. The output of the HDMI 150 port and the SPDIF 160 port is sent to an audio receiver 170. In one embodiment, the audio receiver 170 is an external device to the set top digital video recorder 100.

Figure 2:
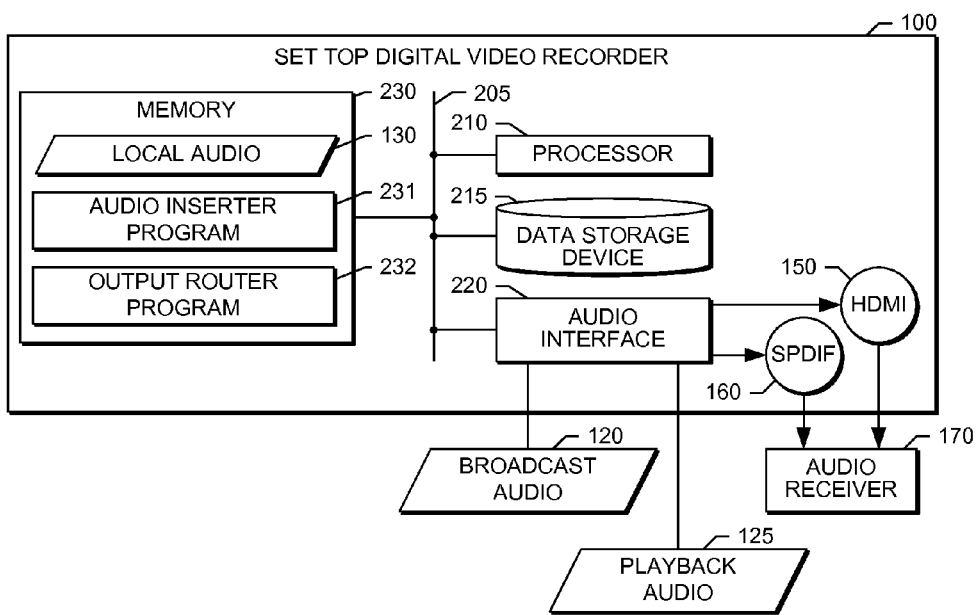
FIG. 2 is a block diagram that illustrates another embodiment of the hardware components shown in FIG. 1.

FIG. 2 is a block diagram that illustrates another embodiment of the hardware components shown in FIG. 1. In particular, FIG. 2 illustrates the hardware components and software comprising the set top digital video recorder 100 shown in FIG. 1.

The set top digital video recorder 100 shown in FIG. 2, in one embodiment, is a general-purpose computing device that performs the present invention. A bus 205 is a communication medium that connects a processor 210, data storage device 215 (such as a Serial ATA (SATA) hard disk drive, optical drive, Small Computer System Interface (SCSI) disk, or the like), audio interface 220, and memory 230 (such as Random Access Memory (RAM), Dynamic RAM (DRAM), non-volatile computer memory, flash drive, or the like). The audio interface 220 receives audio, such as the broadcast audio 120, and outputs audio to the audio ports, such as HDMI 150, and SPDIF 160.

The processor 210 performs the disclosed methods by executing the sequences of operational instructions that comprise each computer program resident in, or operative on, the memory 230. The reader should understand that the memory 230 may include operating system, administrative, and database programs that support the programs disclosed in this application. In one embodiment, the configuration of the memory 230 of the digital video recorder 200 includes the local audio 130, an audio inserter program 231, and an output router program 232. The audio inserter program 231, and output router program 232 perform the method of the present invention disclosed in detail in FIG. 3. When the processor 210 performs the disclosed methods, it stores intermediate results in the memory 230 or data storage device 215. In another embodiment, the memory 230 may swap these programs, or portions thereof, in and out of the memory 230 as needed, and thus may include fewer than all of these programs at any one time.

FIG. 3 is a flow diagram that illustrates a method for seamless switched audio output in a computing device according to an embodiment of the present invention. In particular, FIG. 3, with reference to FIG. 1 and FIG. 2, illustrates the set top digital video recorder 100 seamlessly switching the audio output from broadcast audio 120 to local audio 130, and back to broadcast audio 120.

The process 300 shown in FIG. 3 begins when the set top digital video recorder 100 receives a broadcast audio 120 or playback audio 125 stream (step 302). The audio inserter program 231 then determines whether the set top digital video recorder 100 needs to insert a local audio 130 clip in the broadcast audio 120 or playback audio 125 stream (step 304). If the set top digital video recorder 100 does not receive a request to insert a local audio 130 clip (step 304, N branch), the audio inserter program 231 interfaces with the output router program 232 to send the broadcast audio 120 or playback audio 125 stream to the SPDIF 185 and HDMI 180 ports (step 306). If the set top digital video recorder 100 receives a request to insert a local audio 130 clip (step 304, Y branch), the audio inserter program 231 locates an insertion point (i.e., a start of a subset of frames) in the broadcast audio 120 or playback audio 125 stream (step 308), and then proceeds to identify a local audio 130 clip for insertion. In various embodiments, the process 300 retrieves the local audio 130 clips (step 310) from the memory 230, from the data storage device 215, or from a network (not shown) data storage device. The audio inserter program 231 determines the primary parameters, or main parameters, from the broadcast audio 120 or playback audio 125 stream (step 312). In one embodiment, the audio inserter program 231 makes this determination by examining the program map table (PMT) for the broadcast audio 120 or playback audio 125 stream. In another embodiment, the audio inserter program 231 makes this determination by evaluating the metadata of the encoded broadcast audio 120 or playback audio 125 stream. The audio inserter program 231 then performs a lookup operation to identify the best matching local audio 130 clip based on the previously determined primary parameters, or main parameters (step 314). The audio inserter program 231 may then buffer the broadcast audio 120 or playback audio 125 stream and substitute the selected local audio frames in place of the encoded broadcast audio 120 or playback audio 125 stream (step 316). The audio inserter program 231 then sends the encoded local audio 130 to the SPDIF 160 and HDMI 150 ports (step 318). After sending the encoded local audio, the process 300 returns to receive and output a broadcast audio 120 or playback audio 125 stream (step 302).

The audio inserter program 231 accepts multichannel broadcast audio 120, playback audio 125, and local audio 130 as inputs. The audio inserter program 231 inserts the local audio 130 frames into the broadcast audio 120 or playback audio 125 such that the frame boundaries of the broadcast audio 120 or playback audio 125 are preserved. Thus, for the duration of the local audio 130 clip, the broadcast audio 120 or playback audio 125 frames are dropped, and the local audio 130 frames are inserted. This will result in the start of the first local audio 130 frame coinciding with the end of the broadcast audio 120 or playback audio 125 frame, and the end of the last local audio 130 frame coinciding with the start of a broadcast audio 120 or playback audio 125 frame. The broadcast audio 120 or playback audio 125 stream, in effect, remains muted for the duration of the local audio 130 clip insertion. In one embodiment, the broadcast audio 120 or playback audio 125 stream resumes from the current time. In another embodiment, the broadcast audio 120 or playback audio 125 stream may have been buffered for the duration of local audio clip 130 insertion, hence allowing delayed playing of the buffered frames of the broadcast audio 120 or playback audio 125 stream.

The audio inserter program 231 ensures that the values of the encoding parameters of the local audio 130 clip match those of the broadcast audio 120 or playback audio 125. The present invention prevents the external audio receiver 170 from resetting because it detects a new audio stream on its input channels when the local audio 130 clip is inserted. To achieve a perfect match between the local audio 130 clip and the broadcast audio 120 or playback audio 125, the audio inserter program 231, or in another embodiment, an external off-line program, would encode each local audio 130 clip with all possible parameter values, and store these various local audio 130 clips for later retrieval. During the matching process, the audio inserter program 231 would then locate the best matching local audio 130 clip, either from memory 230 or data storage device 215, and use it for insertion in the broadcast audio 120. Such a brute-force approach (i.e., matching all possible parameters for all possible clips) to achieve a perfect match is very expensive from both a computational and storage perspective. The present invention improves upon two aspects of this brute-force approach to keep the number of local audio 130 clips at a manageable set.

First, all of the parameters in the broadcast audio 120 or playback audio 125 frame are not equally important for matching, irrespective of the audio compression algorithm employed. For instance, when broadcast audio 120 or playback audio 125 employs the Dolby Digital Audio (AC3) encoding technique, the key parameters are the sampling rate, channel configuration, and bitrate, while the remaining parameters are of secondary importance because many decoders either ignore these parameters or handle discontinuities gracefully. Hence, each local audio 130 clip only needs to be encoded with different permutations of the key parameters. To select the best local audio 130 clip to insert, the matching process only matches the key parameters between the broadcast audio 120 or playback audio 125 and local audio 130 clip, leaving the remaining secondary parameters in the selected clip to be recomputed and substituted on the fly (or even ignored) within the local audio 130 clip.

To match the encoding parameters between broadcast audio 120 or playback audio 125 and local audio 130, the audio inserter program 231 must be able to obtain the encoding parameters from the platform software for the set top digital video recorder 100. In one embodiment, when the set top digital video recorder 100 employs MPEG-2 Transport Stream as basis, the audio inserter program 231 obtains the encoding parameter values of broadcast audio 120 or playback audio 125 from the program map table (PMT) that carries audio parameters. In another embodiment, the audio inserter program 231 ensures that it has the current values by monitoring for PMT version changes. In yet another embodiment, the audio inserter program 231 obtains the encoding parameter values from the metadata of the encoded broadcast audio 120 or playback audio 125 stream.

Second, in any practical application the key parameters in the broadcast audio 120 or playback audio 125 are not expected to take every possible value, regardless of the compression algorithm employed. In practice, only a few values are used. Thus, the encoding process only encodes the local audio 130 clip with a subset of the values for the key parameters.

Although the disclosed embodiments describe a fully functioning method for seamless switched audio output in a computing device, the reader should understand that other equivalent embodiments exist. Since numerous modifications and variations will occur to those reviewing this disclosure, the method for seamless switched audio output in a computing device is not limited to the exact construction and operation illustrated and disclosed. Accordingly, this disclosure intends all suitable modifications and equivalents to fall within the scope of the claims.

We claim:

1. A method, comprising:
    receiving a primary audio stream at a computing device, the primary audio stream including a sequence of audio frames;
    sending the audio frames of the primary audio stream to an audio output port of the computing device;
    determining main parameters for the primary audio stream;
    receiving a request at the computing device to insert an encoded local audio clip in the primary audio stream, the encoded local audio clip comprising a sequence of local audio frames;
    locating an insertion point in the primary audio stream, the insertion point coinciding with an end of a frame boundary;
    identifying a best matching encoded local audio clip that is a best match for the main parameters determined for the primary audio stream;
    receiving the best matching encoded local audio clip at the computing device;
    sending audio frames of the best matching encoded local audio clip to the audio output port of computing device;
    storing audio frames of the primary audio stream in a buffer while sending the audio frames of the best matching encoded local audio clip; and
    resuming the sending of the audio frames of the primary audio stream when the sending of the audio frames of the best matching encoded local audio clip is complete.

2. The method of claim 1, wherein the primary audio stream comprises at least one of a broadcast audio stream and a playback audio stream.

3. The method of claim 1, wherein the computing device is a set top digital video recorder.

4. The method of claim 1, wherein the determining of the main parameters further comprises:
    examining a program map table for the primary audio stream.

5. The method of claim 1, wherein the determining of the main parameters further comprises:
    evaluating metadata of the primary audio stream.

6. The method of claim 1, wherein the identifying of the best matching encoded local audio clip further comprises:
    comparing the main parameters to a number of encoded versions of the encoded local audio clip; and
    selecting the best matching encoded local audio clip from the number of encoded versions of the encoded local audio clip.

7. The method of claim 1, wherein the receiving of the best matching encoded local audio clip further comprises:
    retrieving the best matching encoded local audio clip from a data storage device connected to the computing device.

8. The method of claim 1, wherein the audio output port comprises at least one of a SPDIF port and an HDMI port.

9. The method of claim 1, wherein the resuming of the sending of the audio frames of the primary audio stream further comprises:
    sending the audio frames of the primary audio stream that are stored in the buffer.

10. A computing system, comprising:
    a memory device resident in the computing system; and
    a processor disposed in communication with the memory device, the processor configured to:
        receive a primary audio stream at a computing device, the primary audio stream including a sequence of audio frames;
        send the audio frames of the primary audio stream to an audio output port of the computing device;
        determine main parameters for the primary audio stream;
        receive a request at the computing device to insert an encoded local audio clip in the primary audio stream, the encoded local audio clip comprising a sequence of local audio frames;
        locate an insertion point in the primary audio stream, the insertion point coinciding with an end of a frame boundary;
        identify a best matching encoded local audio clip that is a best match for the main parameters determined for the primary audio stream;
        receive the best matching encoded local audio clip at the computing device;
        send audio frames of the best matching encoded local audio clip to the audio output port of computing device;
        store audio frames of the primary audio stream in a buffer while sending the audio frames of the best matching encoded local audio clip; and
        resume the sending of the audio frames of the primary audio stream when the sending of the audio frames of the best matching encoded local audio clip is complete.

11. The computing system of claim 10, wherein the primary audio stream comprises at least one of a broadcast audio stream and a playback audio stream.

12. The computing system of claim 10, wherein to determine the main parameters, the processor is further configured to:
    examine a program map table for the primary audio stream.

13. The computing system of claim 10, wherein to determine the main parameters, the processor is further configured to:
    evaluate metadata of the primary audio stream.

14. The computing system of claim 10, wherein to identify the best matching encoded local audio clip, the processor is further configured to:
    compare the main parameters to a number of encoded versions of the encoded local audio clip; and
    select the best matching encoded local audio clip from the number of encoded versions of the encoded local audio clip.

15. The computing system of claim 10, wherein to receive the best matching encoded local audio clip, the processor is further configured to:

retrieve the best matching encoded local audio clip from a data storage device connected to the computing system.

16. The computing system of claim 10, wherein the audio output port comprises at least one of a SPDIF port and an HDMI port.

17. The computing system of claim 10, wherein to resume the sending of the audio frames of the primary audio stream, the processor is further configured to:
send the audio frames of the primary audio stream that are stored in the buffer.

18. A computing device, comprising:
an audio inserter component configured to:
receive a primary audio stream that includes a sequence of audio frames;
determine main parameters for the primary audio stream;
receive a request to insert an encoded local audio clip in the primary audio stream, the encoded local audio clip comprising a sequence of local audio frames;
locate an insertion point in the primary audio stream, the insertion point coinciding with an end of a frame boundary;
identify a best matching encoded local audio clip that is a best match for the main parameters determined for the primary audio stream; and
receive the best matching encoded local audio clip;
store audio frames of the primary audio stream in a buffer while sending the audio frames of the best matching encoded local audio clip; and
an output router component configured to:
send the audio frames of the primary audio stream to an audio output port;
send audio frames of the best matching encoded local audio clip to the audio output port;
resume the sending of the audio frames of the primary audio stream when the sending of the audio frames of the best matching encoded local audio clip is complete.

19. The computing device of claim 18, wherein the primary audio stream comprises at least one of a broadcast audio stream and a playback audio stream.

20. The computing device of claim 18, wherein to determine the main parameters, the audio inserter component is further configured to:
examine a program map table for the primary audio stream.

21. The computing device of claim 18, wherein to determine the main parameters, the audio inserter component is further configured to:
evaluate metadata of the primary audio stream.

22. The computing device of claim 18, wherein to identify the best matching encoded local audio clip, the audio inserter component is further configured to:
compare the main parameters to a number of encoded versions of the encoded local audio clip; and
select the best matching encoded local audio clip from the number of encoded versions of the encoded local audio clip.

23. The computing device of claim 18, wherein to resume the sending of the audio frames of the primary audio stream, the output router component is further configured to:
send the audio frames of the primary audio stream that are stored in the buffer.

* * * * *